United States Patent [19]

Yamaguchi

[11] Patent Number: 5,010,318
[45] Date of Patent: Apr. 23, 1991

[54] SYSTEM FOR DETECTING MALFUNCTION OF TURBINE SPEED MEASURING DEVICE FOR TORQUE CONVERTER OF AUTOMOTIVE AUTOMATIC TRANSMISSION

[75] Inventor: Hiroshi Yamaguchi, Yokohama, Japan

[73] Assignee: Nissan Motor Co., Ltd., Yokohama, Japan

[21] Appl. No.: 495,123

[22] Filed: Mar. 19, 1990

[30] Foreign Application Priority Data

Apr. 19, 1989 [JP] Japan .................................. 1-99836

[51] Int. Cl.$^5$ .......................... B60Q 9/00; G08B 21/00
[52] U.S. Cl. ................................... 340/439; 340/438; 340/681; 340/671
[58] Field of Search ................ 340/439, 438, 681, 671

[56] References Cited

U.S. PATENT DOCUMENTS

| | | | |
|---|---|---|---|
| 4,267,545 | 5/1981 | Drone et al. | 340/439 |
| 4,320,381 | 3/1982 | Olivier | 340/439 |
| 4,615,321 | 10/1982 | Haefner et al. | 340/438 |
| 4,939,502 | 7/1990 | Ito et al. | 340/438 |
| 4,949,078 | 8/1990 | Ito et al. | 340/438 |

Primary Examiner—Glen R. Swann, III
Attorney, Agent, or Firm—Foley & Lardner

[57] ABSTRACT

A malfunction detecting system issues an alarm signal when a torque converter turbine speed measuring device is out of order. The system comprises a first sensor issuing a first information signal representative of the rotation speed of an output part of an engine; a second sensor issuing a second information signal representative of the rotation speed of an output part of the torque converter; a third sensor issuing a third information signal representative of the rotation speed of an output part of a transmission gear train; and a computer-aided control unit which includes a first section which respectively determines first, second and third reference minimum speeds of the respective output parts of the engine, the torque converter and the transmission gear train, and a second section which issues an alarm signal when the rotation speed derived from the first information signal is higher than the first reference minimum speed, the rotation speed derived from the third information signal is higher than the third reference minimum speed and the rotation speed derived from the second information signal is lower than the second reference minimum speed.

6 Claims, 2 Drawing Sheets

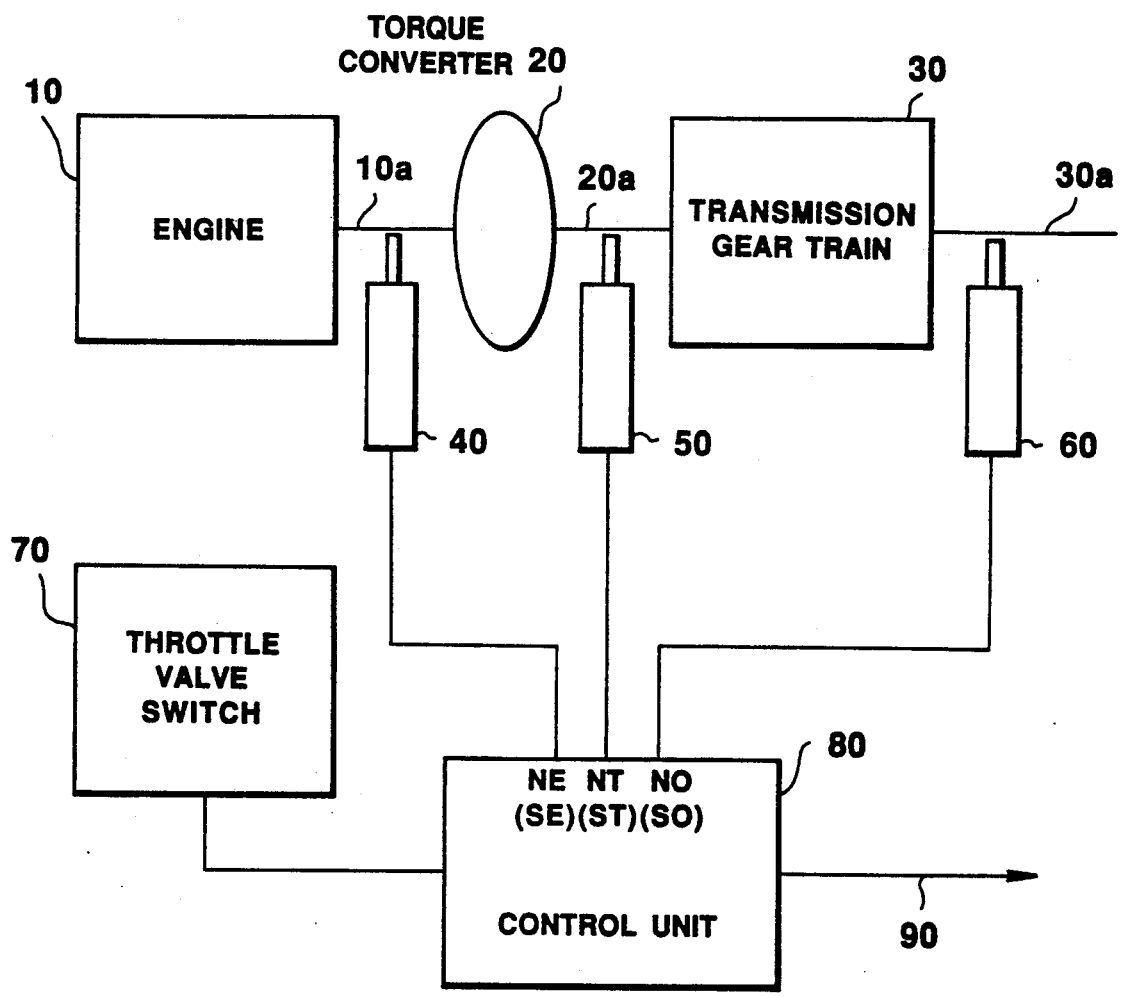

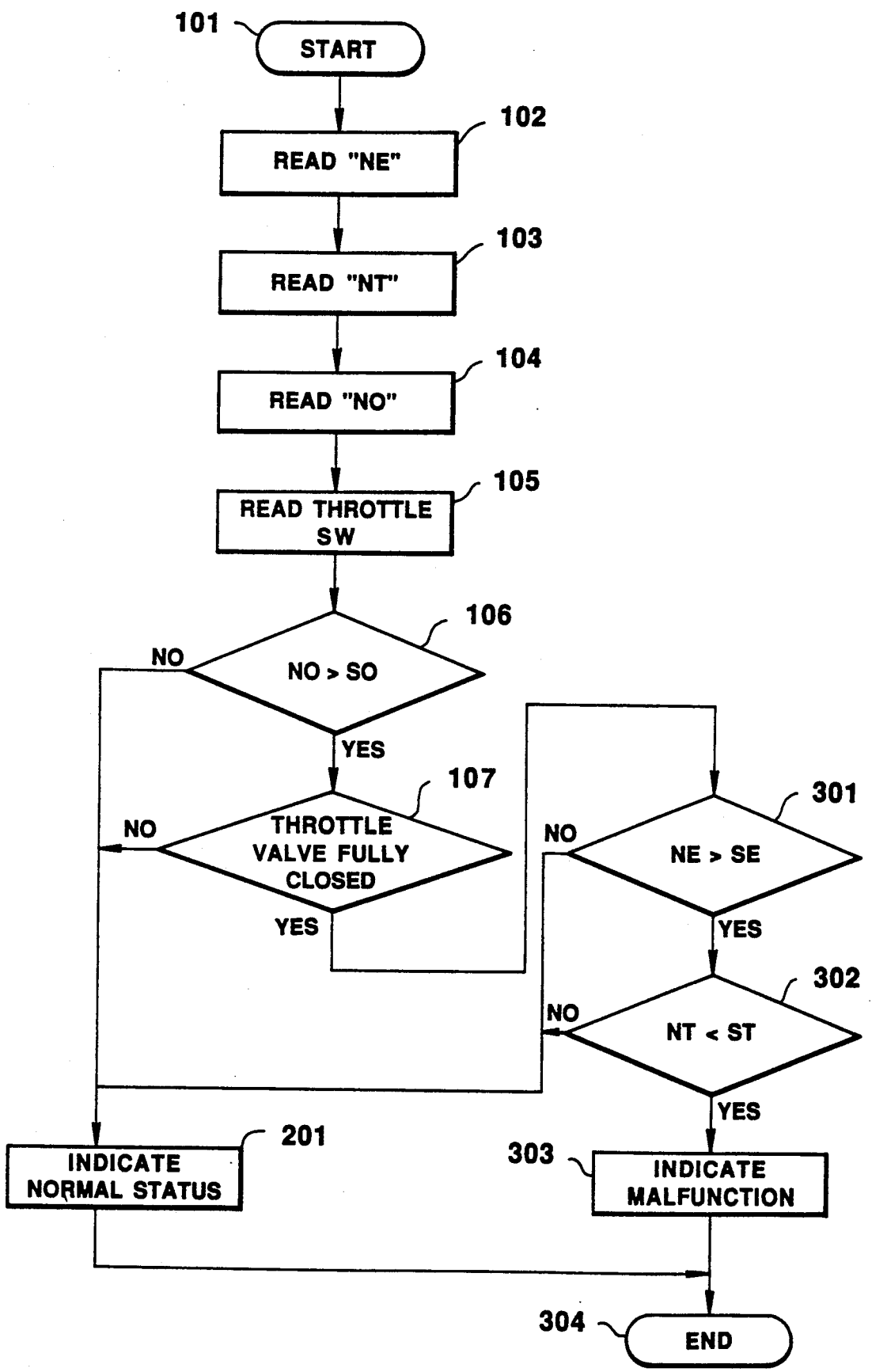

SYSTEM FOR DETECTING MALFUNCTION OF TURBINE SPEED MEASURING DEVICE FOR TORQUE CONVERTER OF AUTOMOTIVE AUTOMATIC TRANSMISSION

BACKGROUND OF THE INVENTION

Field of the Invention

The present invention relates in general to malfunction detecting systems for use in automotive automatic transmissions of a type which comprises a torque converter and a transmission gear train. More specifically, the present invention is concerned with a malfunction detecting system for a rotation-speed-measuring device which measures rotation speed of the output means (or turbine) of the torque converter of an automatic transmission.

Description of the Prior Art

In order to appropriately control automotive automatic transmissions of the above-mentioned type, various control systems have been hitherto proposed, almost all of which are designed to control the line pressure applied to hydraulically operated parts of the transmission. In fact, as is shown in "SERVICE MANUAL FOR RE4R01A TYPE AUTOMATIC TRANSMISSION" issued from NISSAN MOTOR CO., LTD. in March, 1987, these conventional control systems are designed to control the line pressure in accordance with the opening degree of a throttle valve of the associated internal combustion engine.

In order to eliminate or at least minimize unavoidable drawbacks encountered in these conventional control systems, a measure has been proposed by, for example, Japanese Patent application No. 63-17349. In the measure of this Application, the rotation speed of the output means (or turbine) of the torque converter is measured by a so-called "turbine speed measuring device" and the rotation speed thus measured is used as one of control factors for the line pressure.

However, the measure proposed by the Application fails to provide the turbine speed measuring device with a so-called "malfunction detecting system" by which the malfunction of the turbine speed measuring device is detected. Thus, when the measuring device becomes out of order during running of the associated motor vehicle, the transmission, and thus, the motor vehicle is subject to a trouble without giving any alarm to a driver.

SUMMARY OF THE INVENTION

It is therefore an object of the present invention to provide a malfunction detecting system which can eliminate the above-mentioned drawback.

According to the present invention, there is provided a malfunction detecting system which can detect malfunction of a turbine speed measuring device which measures the rotation speed of the output means (or turbine) of the torque converter.

According to the present invention, there is provided a system in a unit including an engine, a torque converter and a transmission gear train. The system comprises a first sensor issuing a first information signal representative of the rotation speed of an output means of the engine; a second sensor issuing a second information signal representative of the rotation speed of an output means of the torque converter; a third sensor issuing a third information signal representative of the rotation speed of an output means of the transmission gear train; first means for respectively determining first, second and third reference minimum speeds of the respective output means of the engine, the torque converter and the transmission gear train; and second means for issuing an alarm signal when the rotation speed derived from the first information signal is higher than the first reference minimum speed, the rotation speed derived from the third information signal is higher than the third reference minimum speed and the rotation speed derived from the second information signal is lower than the second reference minimum speed.

BRIEF DESCRIPTION OF THE DRAWINGS

Other objects and advantages of the present invention will become apparent from the following description when taken in conjunction with the accompanying drawings, in which:

FIG. 1 is a block diagram schematically showing a malfuction detecting system for a torque converter turbine speed measuring device, according to the present invention; and FIG. 2 is a flowchart showing programmed operating steps which are executed by the malfunction detecting system of the invention.

DETAILED DESCRIPTION OF THE INVENTION

Referring to FIG. 1, there is shown a malfunction detecting system of the present invention, which is practically applied to a turbine speed measuring device employed in an automotive automatic transmission.

Denoted by numeral 10 is a prime mover, such as, an internal combustion engine, 20 is a torque converter and 30 is a transmission gear train, which are aligned and assembled in a known manner as shown.

The turbine speed measuring device comprises a turbine speed sensor 50 which senses the rotation speed of the turbine 20a of the torque converter 20. The information signal issued by the turbine speed sensor 50 is fed to a control unit 80 which will be described in detail hereinafter.

In accordance with the present invention, the following measure is employed.

An engine speed sensor 40 is arranged to sense the rotation speed of an output shaft 10a of the engine 10, and a transmission speed sensor 60 is arranged to sense the rotation speed of an output shaft 30a of the transmission gear train 30.

Denoted by numeral 70 is a so-called "engine idling sensor" which senses the idling condition of the engine 10. In the disclosed embodiment, an ON-OFF switch is used as the sensor 70, which is turned ON when a throttle valve of the engine is fully closed. As is known, the throttle valve is operatively installed in an air-fuel passage of the engine 10 to control the power produced by the engine 10.

The control unit 80 is a computer, which is constructed to detect malfunction of the above-mentioned turbine speed measuring device. The control unit 80 has input means to which the information signals from the speed sensors 40, 50 and 60, and ON or OFF signal from the throttle valve switch 70 are fed.

The control unit 80 has a memory part (ROM) in which reference minimum rotation speeds SE, ST and SO respectively required, under idling of the engine 10, by the output shaft 10a of the engine 10, the turbine 20a of the torque converter 20 and the output shaft 30a of the transmission gear train 30 are memorized.

As will be understood as the description proceeds, by receiving the information signals from the three sensors 40, 50 and 60 and the throttle valve switch 70 and treating the same, the control unit 80 issues an output signal (or alarm signal) 90 which represents whether the turbine speed measuring device 50 operates in order or not.

Referring to FIG. 2, there is shown a flowchart which depicts the programmed steps which are executed in the control unit 80.

When an ignition key (not shown) of the associated motor vehicle is turned ON, the programmed flow starts (step 101). At step 102, the rotation speed "NE" of the output shaft 10a of the engine 10 is read from the information signal from the engine speed sensor 40. At step 103, the rotation speed "NT" of the turbine 20a of the torque converter 20 is read from the information signal from the turbine speed sensor 50. Then, at step 104, the rotation speed "NO" of the output shaft 30a of the transmission gear train 30 is read from the information signal from the transmission speed sensor 60. At step 105, the output of the throttle vavle switch 70 is read.

Thereafter, at step 106, a judgement is carried out as to whether the rotation speed "NO" of the output shaft 30a of the transmission gear train 30 is higher than the reference minimum speed "SO" or not (that is, whether the vehicle speed is higher than a certain value or not). If "No", that is, "NO" is lower than "SO", the operation flow goes to step 201 wherein it is judged that the turbine speed measuring device 50 operates in order.

If "Yes", that is, the vehicle speed is higher than the certain value, the flow goes to step 107. At this step, a judgement is carried out as to whether the throttle valve is fully closed or not. If "No", that is, the throttle valve is not fully closed (that is, the engine is not under idling condition), the flow goes to step 201 wherein it is judged that the turbine speed measuring device 50 operates in order.

If "Yes", that is, the throttle valve is fully closed (that is, the engine is under idling condition), the flow goes to step 301. At this step, a judgement is carried out as to whether the rotation speed "NE" of the engine 10 is higher than the reference minimum speed "SE" or not. If "No", that is, "NE" is lower than "SE", the flow goes to step 201 wherein it is 3.udged that the turbine speed measuring device 50 operates in order.

If "Yes", that is, "NE" is higher than "SE", the flow goes to step 302. At this step, a judgement is carried out as to whether the rotation speed "NT" of the turbine 20a is lower than the reference minimum speed "ST" or not. If "No", that is, "NT" is higher than "ST", the flow goes to step 201 wherein it is judged that turbine speed measuring device 50 operates in order.

If "Yes", that is, "NT" is lower than "ST", the flow goes to step 303. At this step, it, is judged that the turbine speed measuring device 50 for the torque converter 20 is out of order.

The above-mentioned programmed flow will be easily understood when taken in conjuction with the following brief explanation.

That is, when an associated motor vehicle assumes a certain condition wherein the engine is idling (viz., throttle valve is fully closed) and the vehicle speed is relatively high (viz., "NO">"SO") and the engine speed is relatively high (viz., "NE">"SE"), the turbine speed of the torque converter should assume a relatively high degree (viz., "NT">"ST"). However, if, under such condition, the turbine speed is detected to be relatively low (viz.. "NT">"ST"), we can judge that a defect occurs in the turbine speed measuring device.

If desired, the following modifications may be employed in the present invention.

In place of the throttle valve switch 70 mentioned hereinabove, a switch sensitive to a fuel injection may be used.

The transmission speed sensor 60 for sensing the rotation speed of the output shaft 30a of the transmission gear train 30 may be of a type which senses the rotation speed of an output gear of the gear train 30.

In the programmed steps, the step 107 for checking the condition of the throttle valve may be removed.

As will be understood from the foregoing description, in accordance with the present invention, the alarm signal is issued when a turbine speed is judged to be lower than a reference value under a condition wherein the turbine speed should be higher than the reference value in view of the surrounding condition.

What is claimed is:

1. In a unit including an engine, a torque converter and a transmission gear train,
   a first sensor issuing a first information signal representative of the rotation speed of an output means of said engine;
   a second sensor issuing a second information signal representative of the rotation speed of an output means of said torque converter;
   a third sensor issuing a third information signal representative of the rotation speed of an output means of said transmission gear train;
   first means for respectively determining first, second and third reference minimum speeds of the respective output means of said engine, said torque converter and said transmission gear train; and
   second means for issuing an alarm signal when the rotation speed derived from said first information signal is higher than said first reference minimum speed, the rotation speed derived from said third information signal is higher than said third reference minimum speed and the rotation speed derived from said second information signal is lower than said second reference minimum speed.

2. A unit as claimed in claim 1, further comprising a fourth sensor which issues a fourth information signal representative of a fully closed condition of a throttle valve of said engine, said fourth information signal being treated by said second means so that said second means issues said alarm signal when the rotation speed derived from said first information signal is higher than said first reference minimum speed, the rotation speed derived from said third information signal is higher than said third reference minimum speed, the rotation speed derived from said second information signal is lower than said second reference minimum speed and said said fourth information signal represents that the throttle valve is fully closed.

3. A unit as claimed in claim 2, in which said second means is suppressed from issuing said alarm signal when the fourth information signal from fourth sensor represents that said throttle valve is opened.

4. A unit as claimed in claim 3, in which said fourth sensor is a switch which is turned ON when said throttle valve is fully closed.

5. A unit as claimed in claim 1, in which the operation of said first and second means is carried out by a computer.

6. In a unit including an engine, a torque converter and a transmission gear train which are assembled in a tandem fashion, a system comprising:

a first sensor issuing a first information signal representative of the rotation speed of an output shaft of said engine;

a second sensor issuing a second information signal representative of the rotation speed of a turbine of said torque converter;

a third sensor issuing a third information signal representative of the rotation speed of an output shaft of said transmission gear train;

a fourth sensor issuing a fourth information signal representative of a fully closed condition of a throttle valve of said engine; and a control unit which treats said first, second, third and fourth information signals by using a computer, said control unit including first and second means, said first means respectively determining first, second and third reference minimum speeds of the respective output parts of said engine, said torque converter and said transmission gear train, said second means issuing an alarm signal when the rotation speed derived from said first information signal is higher than said first reference minimum speed, the rotation speed derived from said third information signal is higher than said third reference minimum speed, the rotation speed derived from said second information signal is lower than said second reference minimum speed and said fourth information signal represents that the throttle valve is fully closed.

* * * * *